US009680768B2

(12) United States Patent
Ishikawa et al.

(10) Patent No.: US 9,680,768 B2
(45) Date of Patent: Jun. 13, 2017

(54) NETWORK APPARATUS AND PACKET PROCESSING DEVICE

(71) Applicant: ALAXALA Networks Corporation, Kanagawa (JP)

(72) Inventors: Shohei Ishikawa, Kanagawa (JP); Toru Sasaki, Kanagawa (JP); Ryouta Mizuno, Kanagawa (JP)

(73) Assignee: Alaxala Networks Corporation, Kanagawa (JP)

( * ) Notice: Subject to any disclaimer, the term of this patent is extended or adjusted under 35 U.S.C. 154(b) by 76 days.

(21) Appl. No.: 14/761,744

(22) PCT Filed: Feb. 18, 2013

(86) PCT No.: PCT/JP2013/053797
§ 371 (c)(1),
(2) Date: Jul. 17, 2015

(87) PCT Pub. No.: WO2014/125635
PCT Pub. Date: Aug. 21, 2014

(65) Prior Publication Data
US 2015/0365354 A1 Dec. 17, 2015

(51) Int. Cl.
*H04L 12/933* (2013.01)
*H04W 72/04* (2009.01)

(52) U.S. Cl.
CPC ......... *H04L 49/101* (2013.01); *H04W 72/044* (2013.01)

(58) Field of Classification Search
CPC .............................. H04W 72/044; H04L 49/101
See application file for complete search history.

(56) References Cited

U.S. PATENT DOCUMENTS

| 6,959,084 B1 * | 10/2005 | DeCraene | H04M 19/00 379/413.02 |
| 6,985,967 B1 * | 1/2006 | Hipp | G06F 1/184 361/788 |
| 2005/0111453 A1 * | 5/2005 | Mizutani | H04L 12/56 370/390 |

(Continued)

FOREIGN PATENT DOCUMENTS

| JP | 10-335854 A | 12/1998 |
| JP | 2009-177681 A | 8/2009 |

(Continued)

OTHER PUBLICATIONS

International Search Report of PCT/JP2013/053797.

*Primary Examiner* — Brian D Nguyen
(74) *Attorney, Agent, or Firm* — Mattingly & Malur, PC (57) ABSTRACT

There is a need for a network interface supporting various line speeds to have a smaller size and provide more flexible accommodation than the related art. In the present invention, provided is a communication device including a transfer processing unit which has four connectors capable of coupling with network interface units to be accommodated in one slot, and a packet processing circuit configured to process a packet input from the network interface via any one of the connectors and output the packet toward the network interface unit to be coupled with the connector, and a path control unit configured to manage a path between the packet processing circuit and the connector.

8 Claims, 7 Drawing Sheets

(56) References Cited

U.S. PATENT DOCUMENTS

| | | | |
|---|---|---|---|
| 2009/0245135 A1* | 10/2009 | Huang | H04L 49/352 370/254 |
| 2011/0170270 A1 | 7/2011 | Inoue et al. | |
| 2011/0205898 A1* | 8/2011 | Ichiki | H04L 45/00 370/235 |
| 2012/0250531 A1* | 10/2012 | Patil | H04W 8/005 370/252 |
| 2013/0003745 A1* | 1/2013 | Nishimura | H04L 12/4641 370/400 |

FOREIGN PATENT DOCUMENTS

| | | |
|---|---|---|
| JP | 2011-004215 A | 1/2011 |
| JP | 2011-146470 A | 7/2011 |

\* cited by examiner

| NETWORK INTERFACE CONNECTION POSITION 210 | NETWORK TYPE INFORMATION 220 | CONNECTOR CONNECTED WITH PIN 52 230 |
|---|---|---|
| LOWER LEFT CONNECTOR 404 | SINGLE HALF-SIZE or DOUBLE HALF-SIZE | UPPER LEFT CONNECTOR 403 |
| | SINGLE FULL-SIZE or DOUBLE FULL-SIZE | LOWER LEFT CONNECTOR 404 |
| | — | UPPER LEFT CONNECTOR 403 |
| LOWER RIGHT CONNECTOR 406 | SINGLE HALF-SIZE or DOUBLE HALF-SIZE | UPPER RIGHT CONNECTOR 405 |
| | SINGLE FULL-SIZE or DOUBLE FULL-SIZE | LOWER RIGHT CONNECTOR 406 |
| | — | UPPER RIGHT CONNECTOR 405 |

Table 310:

| | MAXIMUM NUMBER OF ALLOCATED PINS |
|---|---|
| LOWER LEFT CONNECTOR 404 | N/2 |
| UPPER LEFT CONNECTOR 403 | N/4 |
| LOWER RIGHT CONNECTOR 406 | N/2 |
| UPPER RIGHT CONNECTOR 405 | N/4 |

Table 320:

| NETWORK INTERFACE CONNECTION POSITION | NETWORK INTERFACE TYPE | SIZE | NUMBER OF ALLOCATED PINS OF LOWER LEFT CONNECTOR 404 | NUMBER OF ALLOCATED PINS OF UPPER LEFT CONNECTOR 403 |
|---|---|---|---|---|
| LOWER LEFT CONNECTOR 404 | SINGLE HALF-SIZE | 1 | N/4 | N/4 |
| | SINGLE FULL-SIZE | 2 | N/2 | 0 |
| | DOUBLE HALF-SIZE | 2 | N/4 | N/4 |
| | DOUBLE FULL-SIZE | 4 | N/4 | 0 |
| | — | — | N/4 | N/4 |

Table 330:

| NETWORK INTERFACE CONNECTION POSITION | NETWORK INTERFACE TYPE | SIZE | NUMBER OF ALLOCATED PINS OF LOWER RIGHT CONNECTOR 406 | NUMBER OF ALLOCATED PINS OF UPPER RIGHT CONNECTOR 405 |
|---|---|---|---|---|
| LOWER RIGHT CONNECTOR 406 | SINGLE HALF-SIZE | 1 | N/4 | N/4 |
| | SINGLE FULL-SIZE | 2 | N/2 | 0 |
| | DOUBLE HALF-SIZE | 2 | N/4 | N/4 |
| | DOUBLE FULL-SIZE | 4 | N/4 | 0 |
| | — | — | N/4 | N/4 |

NETWORK APPARATUS AND PACKET PROCESSING DEVICE

TECHNICAL FIELD

The present invention relates to a network apparatus and a packet processing device.

BACKGROUND ART

A network apparatus of the related art is configured such that two network interfaces may be connected in a lateral direction to one packet processing unit as described in PTL 1.

CITATION LIST

Patent Literature

PTL 1: JP 2009-177681 A

SUMMARY OF INVENTION

Technical Problem

In a network apparatus of the next generation, a line speed becomes faster and ten thousand times of scalability is achieved extending lines to support from 10 Mbps to 100 Gbps.

On the other hand, in terms of the physical size of a line port, there is only a difference about several times when compared with a port of 10 BASE-T which is the slowest, and a transceiver of 100 Gbps which is the fastest. Such a difference is small when compared to the difference in the scalability of the line speed. Thus, there is a need for a network interface supporting various line speeds to have a smaller size and provide more flexible accommodation than the related art.

In the related art, it is configured such that a plurality of network interfaces may be connected in the one direction in order to realize the flexible accommodation, however, there is a need to enable the plurality of network interfaces to be connected also in a vertical direction. Meanwhile, even in a case where a network interface having a large line capacity is used, there is a need to enable connection using one connector, but according to this method, a transmission signal pin to be allocated to each connector from a packet forwarding engine is insufficient.

Solution to Problem

In order to solve at least one of the above-described problems, according to an aspect of the present invention, provided is a network apparatus including a transfer processing unit which has four connectors capable of coupling with network interface units to be accommodated in one slot, and a packet processing circuit configured to process a packet input from the network interface via any one of the connectors and output the packet toward the network interface unit to be coupled with the connector, and a path control unit configured to manage a path between the packet processing circuit and the connector.

More specifically, for example, the path control unit of the network apparatus allocates a transmission signal pin being output from a packet forwarding engine according to a type of the network interface to be connected.

Advantageous Effects of Invention

According to an aspect of the present invention, it is possible to cope with various network interfaces.

DESCRIPTION OF EMBODIMENTS

Figure 1:
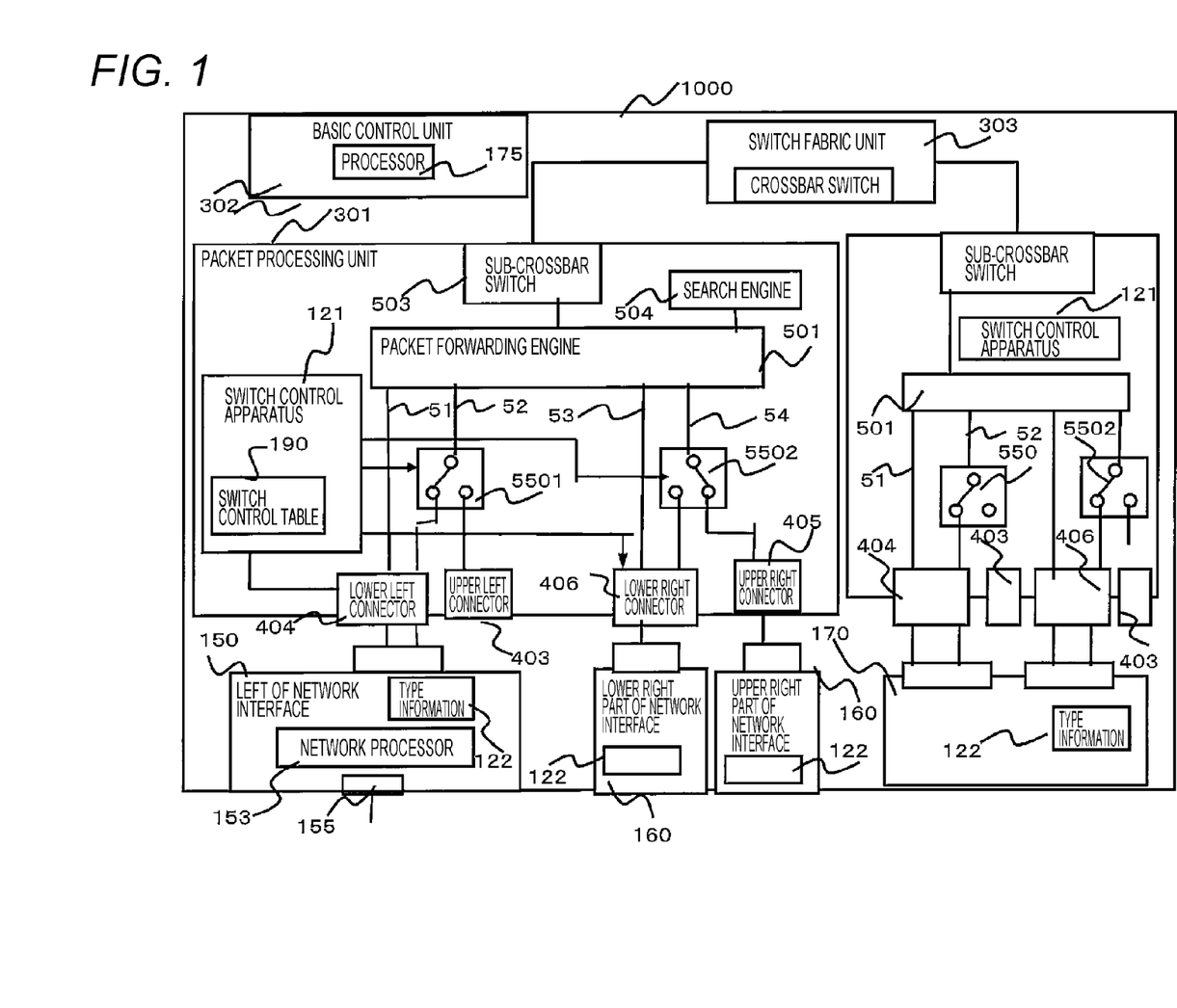
FIG. 1 A configuration diagram of a network apparatus.

FIG. 1 illustrates a configuration of a network apparatus.
A network apparatus 1000 mainly has a basic control unit 302, a switch fabric unit 303, two packet processing units 301, and network interface units 150, 160 and 170.

The packet processing unit 301 is an example of a packet processing unit or a packet processing device which has at least four connectors capable of coupling with one of network interfaces having different sizes to be accommodated in one slot, a packet forwarding unit configured to process a packet to be input from the network interface via any one of the connectors, and output the packet toward a network interface unit to be coupled with the connector, and a path control unit configured to manage a path between the packet forwarding unit and the connector.

The packet processing unit 301 is connected to the single full-size network interface unit 150 via an upper left connector 403 and a lower left connector 404. The packet processing unit 301 is connected with the two single half-size network interface units 160 via an upper right connector 405 and a lower right connector 406. In addition, the other packet processing unit 301 is connected to the double full-size network interface unit 170 via the upper left connector 403, the lower left connector 404, the upper right connector 405 and the lower right connector 406.

The network interface unit 150 has a port 155 to be connected to a line, a network processor 153 to be connected to the port and a connector 178 on the network side via an internal bus, and type information 122 to be stored in a memory (not illustrated). The type information is information indicating a property of the network interface unit, and for example, information indicating a size of the network interface unit. In this embodiment, for example, four types of the size including a single half-size, a double half-size, a single full-size and a double full-size are used as the size, but the present invention is not limited to such sizes or the number of sizes. In this embodiment, information specifying the single full-size is included in the type information 122 to be stored in the memory of the network interface unit 150.

Incidentally, similarly to the network interface unit 150, each of the network interface units 160 and 170 also has the port 155 to be connected to the line, the network processor 153 to be connected to the port and the connector 178 on the network side via the internal bus, and the type information 122 to be stored in the memory. In addition, information specifying the single half-size is included in the type information 122 to be stored in the memory of the network interface unit 160. Information specifying the double full-size is included in the type information 122 to be stored in the memory of the network interface unit 170.

The packet processing unit 301 has the connectors to which the network interface unit is connected, that is, the upper left connector 403, the lower left connector 404, the upper right connector 405 and the lower right connector 406.

The packet processing unit 301 has a packet forwarding engine 501, a search engine 503 and a sub-crossbar switch 504. The search engine 503 is a circuit configured to perform a process of searching output destination of a packet received via the network interface unit according to the information included in a header of the packet.

The packet forwarding engine 501 is a circuit configured to perform a process of forwarding the received packet to the output destination specified by the search engine.

The sub-crossbar switch 504 is an interface to a crossbar switch 185 and capable of communicating with one or more of other packet processing units via the crossbar switch 185.

The packet forwarding engine 501 is connected to transmission signal pins 51, 52, 53 and 54.

The transmission signal pin 51 is a pin connecting the connector 404 and the packet forwarding engine 501. Data transmission of a packet or the like is performed between the connector 404 and the packet forwarding engine 501 using the transmission signal pin 51.

The transmission signal pin 52 is a pin connecting the upper left connector 403 or the lower left connector 404 and the packet forwarding engine 501. Any one among the plurality of connectors to which the transmission signal pin 52 is connected is determined according to a switch direction of a switch 5501. The transmission signal pin 52 allows data transfer of a packet or the like through the switch 5501 between the upper left connector 403 or the lower left connector 404, and the packet forwarding engine 501.

The transmission signal pin 53 is a pin connecting the connector 406 and the packet forwarding engine 501. Data transmission of a packet or the like is performed between the connector 406 and the packet forwarding engine 501 using the transmission signal pin 53. The transmission signal pin 54 allows data transfer of a packet or the like between the upper right connector 405 or the lower right connector 406, and the packet forwarding engine 501.

As described above, any one among the plurality of connectors to which each of the transmission signal pin 52 and the transmission signal pin 54 is connected is determined according to each switch direction of the switch 5501 and a switch 5502. In addition, both the transmission signal pin 51 and the transmission signal pin 53 are connected to the connectors at the lower side, that is, the lower left connector 404 and the lower right connector 406 without performing switching, and data from the packet forwarding engine 501 and data to the packet forwarding engine 501 are transmitted via the transmission signal pin 51 or 53.

Further, the packet processing unit 301 has a switch control apparatus 121. The switch control apparatus 121 is an example of a path management unit which manages a path (the transmission signal pin) between the packet forwarding unit (the packet forwarding engine) and the connector.

The switch control apparatus 121 is connected to the connectors 403, 404, 405 and 406 via the internal bus. The switch control apparatus 121 acquires the type information 122 from the network interface unit 150 or 160 to be connected to these connectors. The switch control apparatus 121 is connected to the switch 5501 and the switch 5502 via the internal bus. The switch control apparatus 121 has a switch control table 121 showing associations among a connection position of the network interface, the type information, and designation of the connector to be connected.

The switch control apparatus 121 controls the switch direction of the switch 5501 and the switch 5502 using the acquired type information 122 and the switch control table 121. According to such control by the switch control apparatus 121, each of the transmission signal pin 52 and the transmission signal pin 54 is connected to any one of the plurality of connectors 404 and 405, and the data transmission is performed between the packet forwarding engine 51 and the connector. In other words, the switch control apparatus 121 is the path control unit which manages the path between a packet processing circuit of the packet processing unit 301 and the connector. Incidentally, the switch control apparatus 121 may be provided for each switch.

Incidentally, the switches 5501 and 5502 may be provided for all the transmission signal pins. Otherwise, the switch direction of the data transmission of a plurality of the transmission signal pins may be determined by the switch control apparatus 121 in unit of the certain number of the transmission signal pins in a switch processing unit including a plurality of the switches.

A processor 175 is mounted to the basic control unit 302, and is configured to mainly perform a routing protocol processing and apparatus control. In addition, the basic control unit 302 is configured to receive a command from an input unit, and output a state of the packet processing unit 301 or the network interface unit, information of the network interface unit to be connected to the packet processing unit 301, and a switching state according to the switching control apparatus to a display unit.

In addition, the packet processing unit 301 has the switch control apparatus, the switch control table, the connector, the switch and the circuits (the packet forwarding engine and the search engine) which execute a function necessary for packet relay, similarly to the packet processing unit 301.

In addition, although the two packet processing units 301 are illustrated, one or three or more of packet processing units 115 may be provided. Further, a plurality of the packet processing units 115 may allow the data transmission via a backplane or a switch fabric unit. Through such data transmission, a packet as a target to be relayed may be input to and output from the network via the network interface units 150, 160 and 170 to be accommodated in different packet processing units.

Figure 2:
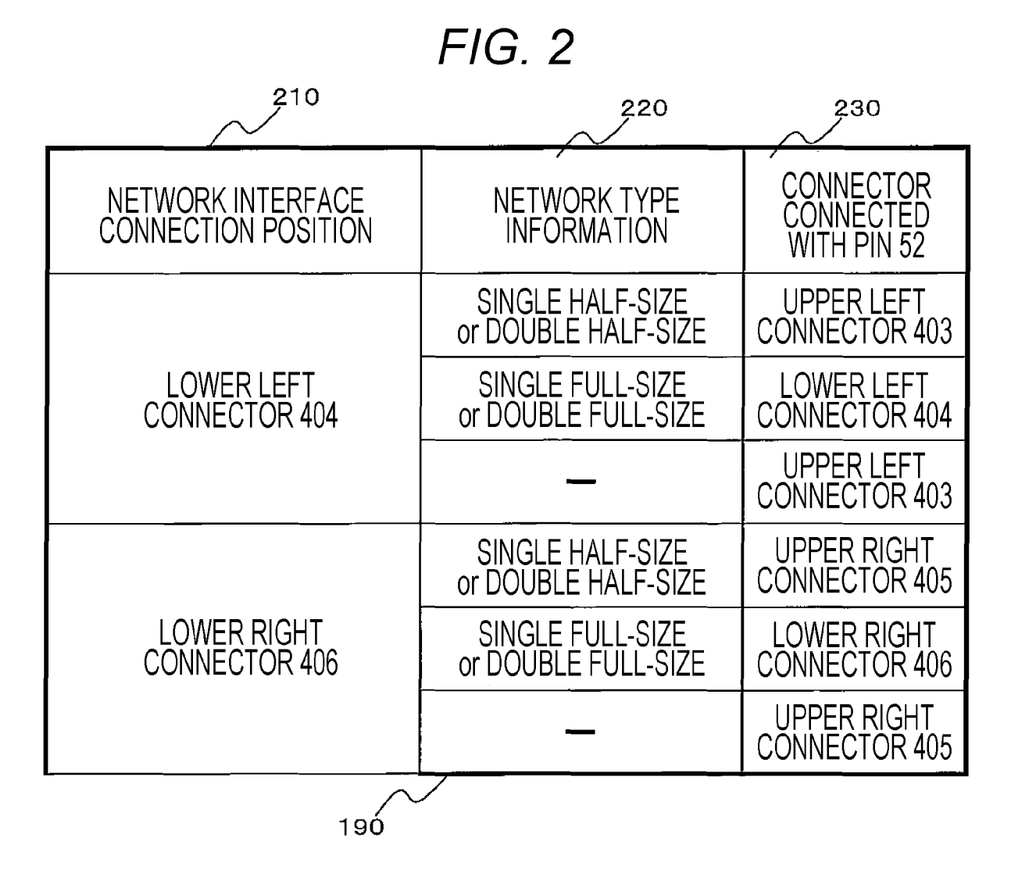
FIG. 2 A connector connected with a pin 52 and a pin 54 according to a network interface connection position and network type information.

FIG. 2 is an example of a switch control table 190. FIG. 2 shows any connector to which each of the output transmission signal pin 52 and the output transmission signal pin 54 is connected from a relation between the type information 122 of the network interface and the connection position of the network interface.

The switch control table 190 shows associations among a network interface connection position 210, network type information 220, and a connector 230 to which the pin 52 is connected.

Sections of the network interface connection position 210 indicate a position at which the network interface is connected, and the connected connector, and the lower left connector 404 is associated with the switch 5501 at the left side and the lower right connector is associated with the switch 5502 at the right side. The network interface type 220 is the type information of the connected network interface, and the connector 230 to which the pin 52 and the pin 54 are connected indicates any connector to which each pin is connected. Incidentally, in the table, a hyphen indicates the time when the network interface is not connected to the lower connector.

Figure 3:
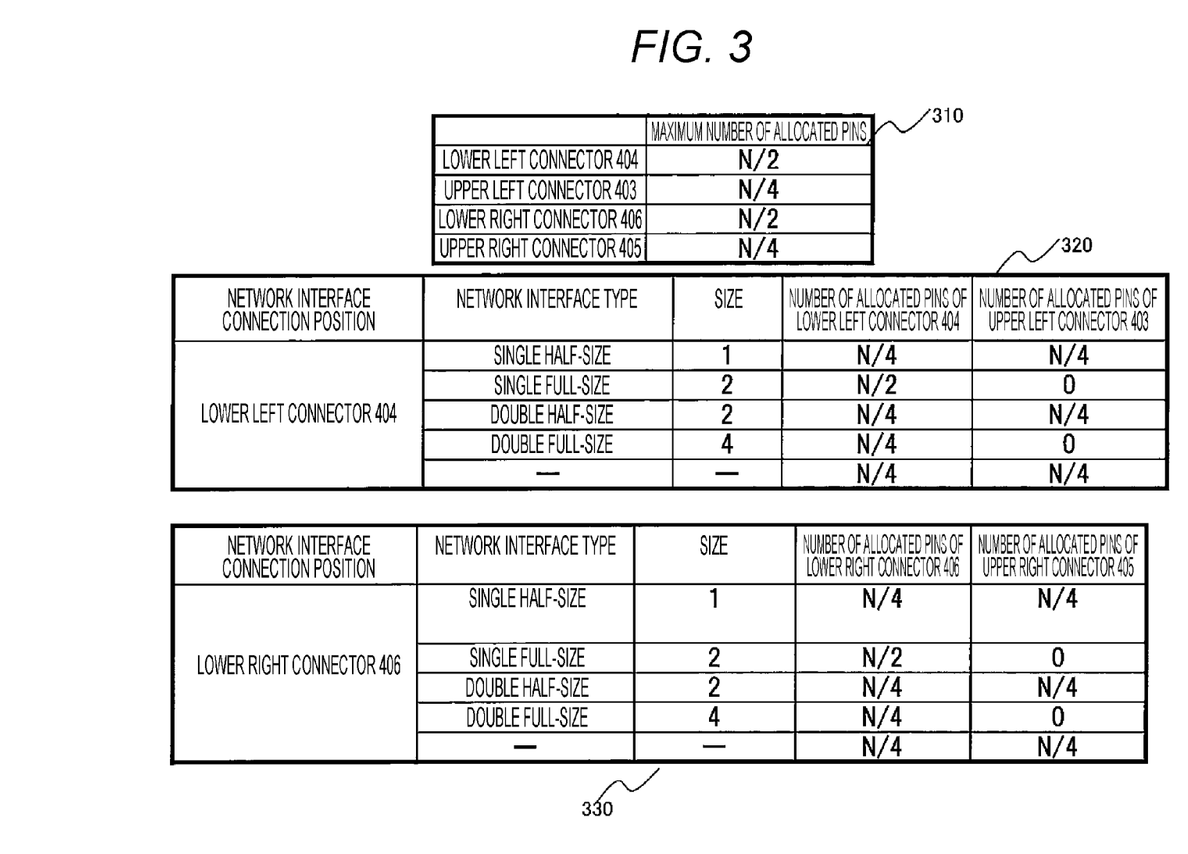
FIG. 3 The maximum number of pins allocated to one connector and the number of pins allocated to each connector according to a network interface type.

FIG. 3 illustrates a table 310 showing the maximum number of the pins that may be allocated to each of the four connectors, that is, the upper left connector 403, the lower left connector 404, the upper right connector 405 and the lower right connector 406. When the total of the transmission signal pins to be output from the packet forwarding engine 501 to the network interface is N pins, the maximum number of the allocated pins of each connector is as follows: N/2 pins for the lower left connector 404, N/4 pins for the upper left connector 403, N/2 pins for the lower right connector 406, and N/4 pins for the upper right connector 405.

A table 320 shows the number of the allocated pins of each connector in relation to the left connectors from the relation between the network interface type information 122 and the network interface connection position. A table 330 shows the number of the allocated pins of each connector in relation to the right connectors from the relation between the network interface type information 122 and the network interface connection position. In the table, a size refers to a size of each network interface when a size of the single half-size network interface is one. The total of the transmission signal pins to be output from the packet forwarding engine 501 to the network interface is N pins. In a case where the network interface is connected to the lower left connector 404, and the network interface type is the single half-size or the double half-size, the number of the allocated pins of the lower left connector 404 is N/4, and the number of the allocated pins of the upper left connector 403 is N/4. In a case where the network interface is connected to the lower left connector 404, and the network interface type is the single full-size or the double full-size, the number of the allocated pins of the lower left connector 404 is N/2, and the number of the allocated pins of the upper left connector 403 is zero. In a case where the network interface is not connected to the lower left connector 404, the number of the allocated pins of the lower left connector 404 is N/4, and the number of the allocated pins of the upper left connector 403 is N/4. In a case where the network interface is connected to the lower right connector 406, and the network interface type is the single half-size or the double half-size, the number of the allocated pins of the lower right connector 406 is N/4, and the number of the allocated pins of the upper right connector 405 is N/4. In a case where the network interface is connected to the lower right connector 406, and the network interface type is the single full-size or the double full-size, the number of the allocated pins of the lower right connector 406 is N/2, and the number of the allocated pins of the upper right connector 405 is zero. In a case where the network interface is not connected to the lower right connector 406, the number of the allocated pins of the lower right connector 406 is N/4, and the number of the allocated pins of the upper right connector 405 is N/4.

Figure 4:
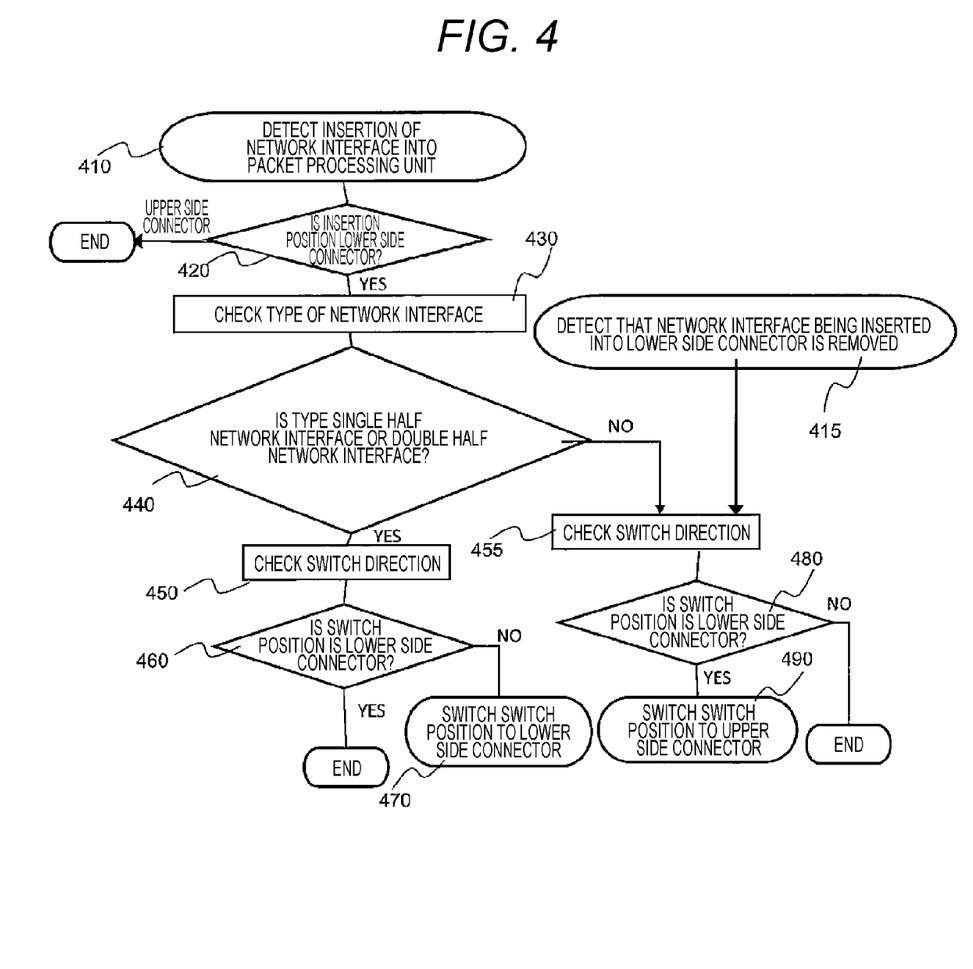
FIG. 4 A flow of switching a switch (at the time of connecting a network interface).

FIG. 4 illustrates a flowchart of switching the switch.

The switch control unit is configured to monitor a mounting state of the network interface and detect insertion and removal of the network interface. In a case where it is detected that the network interface is inserted into the upper left connector 403 and the upper right connector 405 (410), the switch control apparatus 121 switches the switch 5501 to the upper-side connector. The switch control apparatus 121 is configured to determine whether the insertion position of the network interface is the lower-side connector (420). In a case where the network interface is inserted into the lower left connector 404 and the lower right connector 406 (Yes in 420), the switch control apparatus 121 reads the type information 122 of the network interface and checks a type of the network interface (430). If the type is the single full-size or the double full-size, the switch control apparatus 121 checks the switch direction (460) with reference to the switch control table 190, and the process ends when the switch position of the switch (5501 or 5502) is the lower-side connector. The switch control apparatus 121 sends the switch an instruction for switching the switch position to the lower-side connector in a case where the switch direction is the upper side (No in 460) as the result of checking the switch direction.

Meanwhile, in a case where the type of the network interface is the single half-size or the double half-size as the result of the check, the switch control apparatus 121 checks the switch direction (455), and send the switch (5501, 5502) an instruction for switching the switch 5502 to the upper-side connector when the switch position is the lower-side connector (Yes in 480). On the contrary, in a case where one of the switches is not the lower-side connector (No in 455) as the result of the check of report of the switch, the process ends. Further, the switch control apparatus 121 regularly monitors the state of the network interface and in a case of detecting the network interface is removed from the lower connector (415), the switch control apparatus 121 switches the switch 5502 to the upper-side connector when the switch position is the lower-side connector side (Yes in 455 or 480).

A description will be made using a specific example. When the network interface is connected to the packet processing unit 301, the switch control apparatus 121 mounted to the packet processing unit 301 reads the network interface type information 122 from the network interface (430). In a case where the network interface is connected to the lower left connector 404, and the network type information is the single half-size or the double half-size (Yes in 440), the switch control apparatus 121 switches the switch 5501 so that the output transmission signal pin 52 is connected to the upper left connector 403 (No in 460).

In a case where the network interface is connected to the lower left connector 404, and the network type information is the single full-size or the double full-size (No in 440), the switch control apparatus 121 switches the switch 5501 so that the output transmission signal pin 52 is connected to the lower left connector 404 (No in 480). Incidentally, in a case where the network interface is not connected to the lower left connector 404, the switch control apparatus 121 switches the switch 5501 so that the output transmission signal pin 52 is connected to the upper left connector 403.

In a case where the network interface is connected to the lower right connector 406, and the network type information is the single half-size or the double half-size (Yes in 440), the switch control apparatus 121 switches the switch 5502 so that the output transmission signal pin 54 is connected to the upper right connector 405 (No in 460). In a case where the network interface is connected to the lower right connector 406, and the network type information is the single full-size or the double full-size (No in 440), the switch control apparatus 121 switches the switch 5502 so that the output transmission signal pin 54 is connected to the lower right connector 405 (No in 480). Incidentally, when the network interface is not connected to the lower right connector 406, the switch control apparatus 121 switches the switch 5502 so that the output transmission signal pin 54 is connected to the upper right connector 405.

Figure 5:
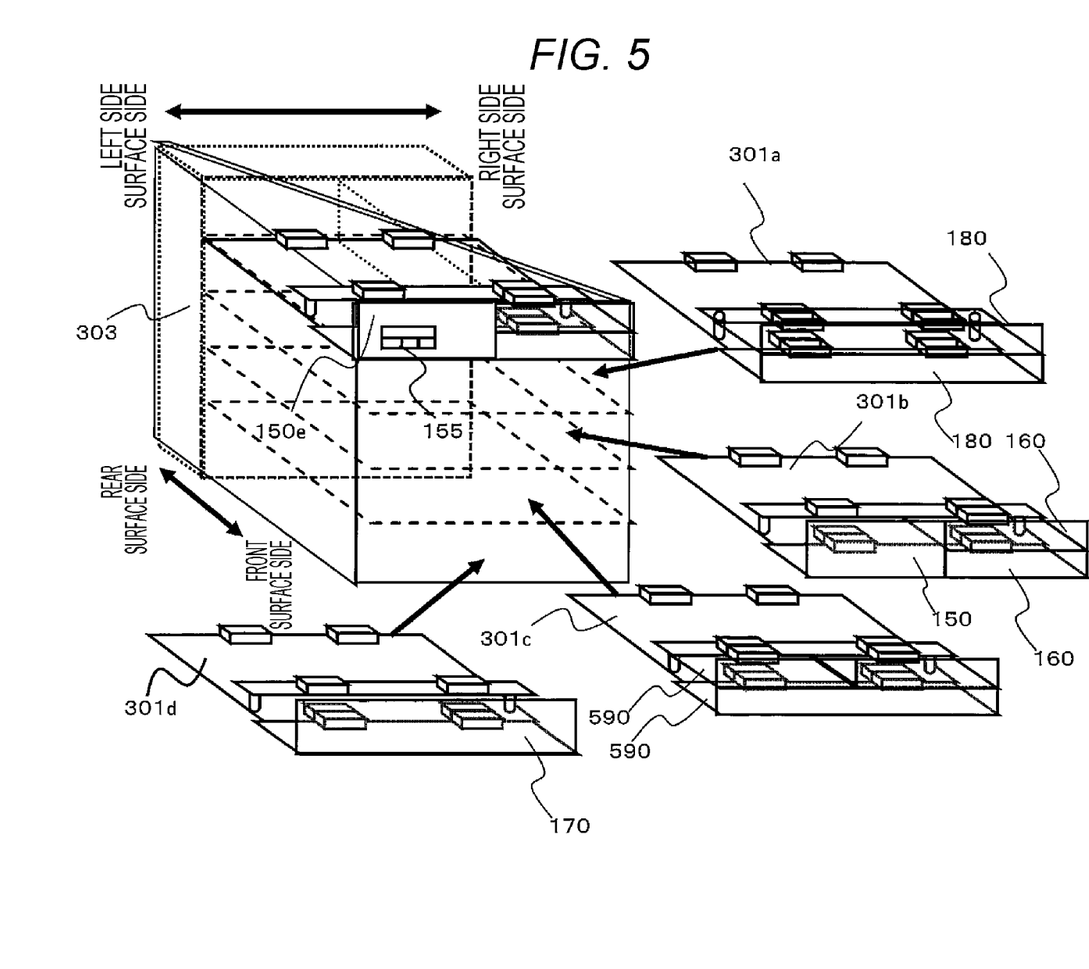
FIG. 5 An external view of a plurality of mobiles of a packet processing unit and a network apparatus.

FIG. 5 illustrates a state in which a plurality of packet processing units 301 is coupled inside a casing 201 of the network apparatus, and the network interface is coupled with the plurality of packet processing units 301. Incidentally, the casing 201 has a plurality of vertically configured slots on a front surface side, and the switch fabric unit 303 on the rear surface side. Each slot and packet processing unit is inserted from the front surface side to the rear surface side in a horizontal direction and the switch fabric unit is coupled. In FIG. 5, a single full-size network interface 150e having a half width and a full height is loaded to the slot at the top. The port 155 to be connected to a network cable is provided to the front surface side of the casing of the network interface 150e. The packet processing units 301a, 301b, 301c, 301d and 301e to be coupled with one or two or more of the network interfaces 150, 160, 170 and 180, respectively, via the connector are mounted also to the other slots. As described above, the casing of the network apparatus, illustrated in FIG. 5, is provided with the plurality of slots capable of accommodating the plurality of network interfaces. Two or more of the network interfaces (150, 160, 180) are two-dimensionally disposed on a plane parallel to a surface of a substrate (590) of the network interface in the slot. The network interface has a different size in two axial directions orthogonal to each other in a plane perpendicular to the substrate. Further, the packet processing units 301a, 301b, 301c, 301d and 301e have a plurality of connectors to be electrically connected to the network interface. The plurality of connectors is two-dimensionally disposed when viewed from the front surface side of the casing, and is electrically connected to the same network interface while being coupled with the connector one-dimensionally disposed parallel to the substrate surface. Incidentally, in FIG. 5, a connection mode at the time of being loaded is that schematically illustrated in FIG. 1.

As the network interface, four types of the network interfaces are exemplified, that is, a single half-size 160 having a half width and a half height, a single full-size 150 having a half width and a full height (corresponding to a height of the slot), a double half-size 180 having a full width and a half height, and a double full-size 170 having a full width (corresponding to a width in a lateral direction of the slot) and a full height, with respect to one slot. These network interfaces also have the port 155 on the front surface side of the casing. The packet processing unit 301a of the casing 201 of the network apparatus is coupled with one single full-size network interface and two single half-size network interfaces 160. At this time, the output transmission signal pin 52 is connected to the lower left connector 404, and the output transmission signal pin 54 is connected to the upper right connector 405.

Next, the packet processing unit 301b is coupled with two double half-size network interfaces 180 via the connector. At this time, the output transmission signal pin 52 is connected to the upper left connector 403, and the output transmission signal pin 54 is connected to the upper right connector 405.

The packet processing unit 301c is connected with one double half-size network interface 180 and two single half-size network interfaces 160 via the connector. At this time, the output transmission signal pin 52 is connected to the upper left connector 403, and the output transmission signal pin 54 is connected to the upper right connector 405. The packet processing unit 301d is coupled with the double full-size network interface 170. At this time, the output transmission signal pin 52 is connected to the lower left connector 404, and the output transmission signal pin 54 is connected to the lower right connector 406. In addition to this, four single half-size network interfaces or two single full-size network interfaces may be connected. In addition, the packet processing unit 301 may communicate with another packet processing unit 301 by the switch fabric unit 303.

Next, a description will be made regarding an example of checking the mounting state of the NIF of the network apparatus. When the network apparatus 1000 receives a command of "show nif" from a management terminal, information of mounting the network interface is acquired. Here, a network device equipped with two packet processing units is exemplified. A PPU is the packet processing unit, and the NIF's 0 to 7 are a number of the connector provided in the PPU as the network interface of the PPU. The network interface, the network interface number, the mounting state and the network interface type are displayed in association with one another. An output example is as follows.

show nif
PPU 0
NIF 0: active NIF_TYPE
NIF 1: active NIF_TYPE
NIF 2: unused
NIF 3: active NIF_TYPE
PPU 1
NIF 4: active NIF_TYPE
NIF 5: active NIF_TYPE
NIF 6: active NIF_TYPE
NIF 7: active NIF_TYPE According to such output, a manager may apprehend which connector is being used and which type of the NIF is being connected.

Figure 6:
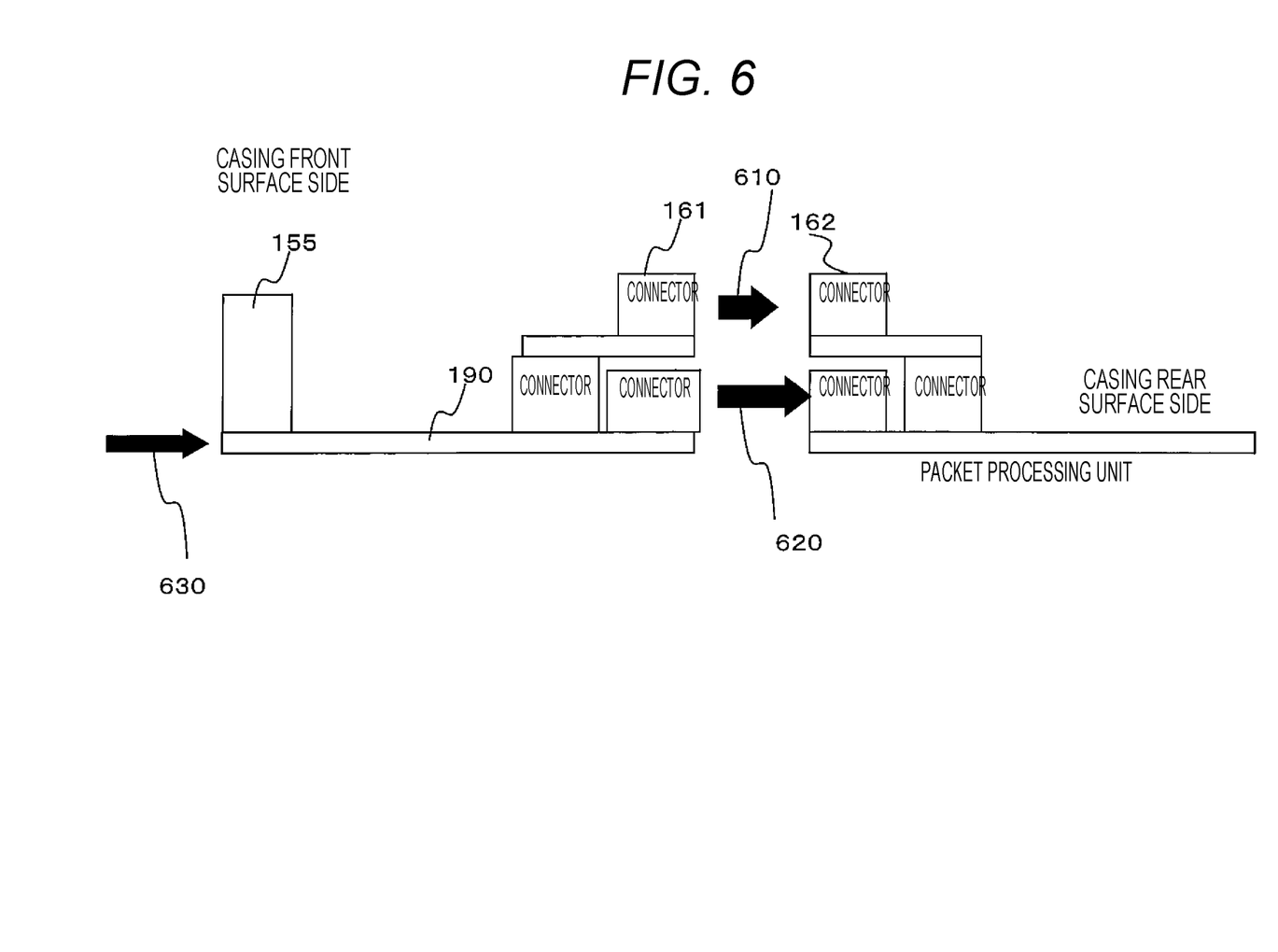
FIG. 6 A diagram illustrating a problem.

FIG. 6 is a diagram illustrating an aspect of connecting the network interface when viewed from the side. Using this example, a description will be made regarding the problem in a case where the single full-size network interface or the double full-size network interface is connected to the packet processing unit 301 without mounting the switch 5501 and the switch 5502. As illustrated in FIG. 6, the plurality of connectors of the network interface needs to be disposed in the vertical direction. The reason for this is because there is a limit to the transmission signal pins to be output from the packet forwarding engine 501, and accordingly, when the transmission signal pins are allocated to the four connectors, a transmission band is insufficient in a case where the single full-size network interface or the double full-size network interface is connected. In addition, in the case where the plurality of connectors of the network interface is disposed in the vertical direction, when a front surface of the network interface is pressed (630) in order to connect the network interface to the packet processing unit, a force is not uniformly applied since a connector 161 is not applied with the force directly from the horizontal direction (610 and 620) so that the engagement between the connector 161 and a connector 162 may not be properly achieved. This causes the problem of engagement when a connector on the substrate of the network interface is coupled with a connector on a plane different from the substrate surface.

Figure 7:
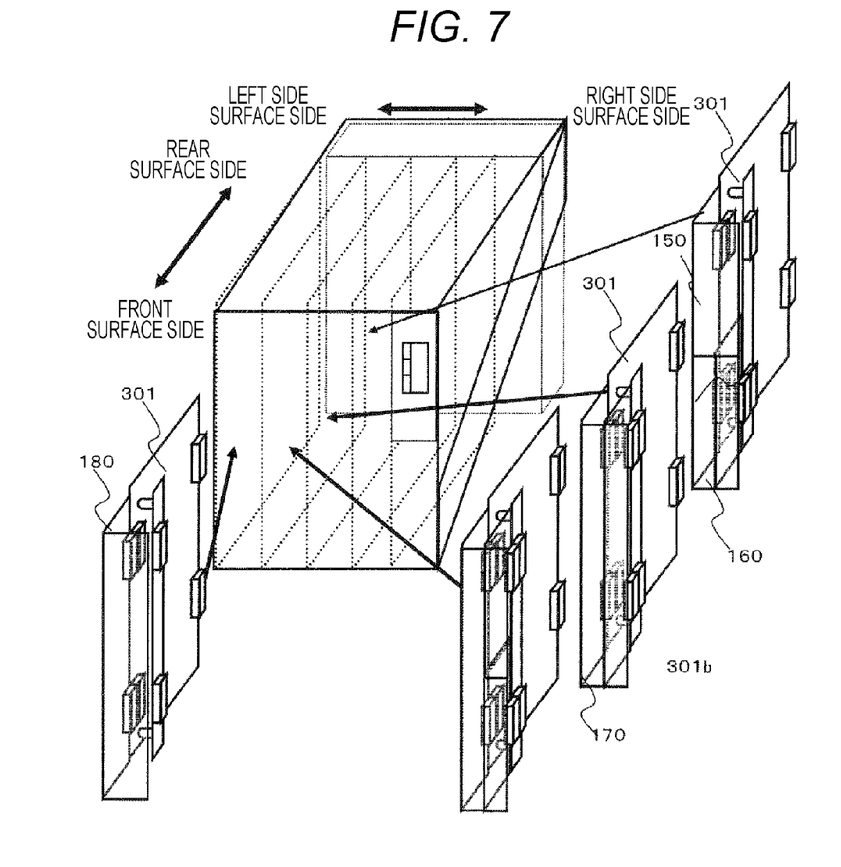
FIG. 7 A modified example of the network apparatus.

FIG. 7 is a modified example of the casing 201 of the network apparatus 1000 illustrated in FIG. 5. FIG. 7 is a view achieved by rotating FIG. 5 at 90 degree to the right when viewed from the front surface of the casing. An alignment direction of the slot and the substrate of the network interface is lateral direction when viewed from the front surface side of the casing. Respective network interfaces 150, 160, 170 and 180 having different sizes are coupled with the common packet processing unit 301, and disposed in a direction of right and left on the casing of the network apparatus. The other configuration is the same as the embodiment that has been described with reference to FIGS. 1 to 5. Accordingly, when the connector is disposed vertically while standing on the substrate surface of the packet processing unit, the same problem as in FIG. 6 is caused. Thus, it is possible to apply the configuration or the process illustrated in FIGS. 1 to 5 of the embodiment.

A part or all the above-described configurations, functions, processing units, processing means or the like may be realized using hardware, for example, by designing using an integrated circuit or the like. In addition, the above-described configurations, functions and the like may be realized using software by allowing a processor to interpret and execute a program configured to implement each function. Information such as the program implementing each function, a table and a file may be stored in a recording device such as a memory, a hard disk and a solid state drive (SSD), or a recording medium such as an IC card, an SD card and a DVD. In addition, a control line and an information line, considered to be necessary for description, are illustrated, and it is not limited such that all the control lines and information lines required for the product are illustrated. It may be considered that almost all the configurations are connected to one another in actual.

REFERENCE SIGNS LIST

1000 network apparatus
301 packet processing unit
501 packet forwarding engine
5501 switch for left connector
5502 switch for right connector
121 switch control apparatus

The invention claimed is:

1. A network apparatus to be connected to a network, the network apparatus comprising
   at least one packet processing unit, each packet processing unit including at least four connectors capable of coupling with one of a plurality of network interfaces having different sizes to be accommodated in one slot, a packet forwarding unit configured to process a packet to be input from one of the network interfaces via any one of the connectors, and output the packet toward a network interface to be coupled with the connector, and a path control unit configured to manage a path between the packet forwarding unit and the connector;
   wherein the path control unit is configured to determine a state of the path when detecting that one of the connectors is electrically connected to the network interface, and control the path on the basis of the determination result.

2. The network apparatus according to claim 1, wherein the path control unit is configured to monitor a state of the connectors, and detect whether the connectors are electrically connected to the network interfaces.

3. The network apparatus according to claim 1, wherein the connectors are disposed in a two-dimensional direction on a plane perpendicular to a surface of a substrate of the network interfaces.

4. The network apparatus according to claim 1, the network apparatus further comprising
   a management unit, wherein
   four or more of the connectors are provided, and
   the management unit is configured to acquire a state of the connector indicating whether the connector is electrically connected to the network interface, and output the state of the connector to each of the at least one packet processing unit.

5. The network apparatus according to claim 1, the network apparatus further comprising
   a switch fabric unit configured to forward a packet between a plurality of packet forwarding units, wherein
   the packet forwarded via the switch fabric unit is transmitted to a network via the network interface to be electrically connected to the connector.

6. A network apparatus comprising:
   at least a slot capable of accommodating a plurality of network interfaces; and
   a plurality of connectors to be electrically connected to the slot and the network interfaces, wherein
   the slot includes a packet processing unit,
   the plurality of network interfaces are two-dimensionally disposed on a plane parallel to a surface of a substrate of the network interfaces inside the slot, with respect to the slot,
   at least two of the network interfaces have different sizes in two axial directions orthogonal to each other in a plane perpendicular to the parallel plane,
   the connectors are two-dimensionally disposed in a plane perpendicular to the substrate surface and are disposed in a one-dimensional direction in the plane perpendicular to the substrate surface for each network interface;
   the packet processing unit includes a packet forwarding unit configured to process a packet to be input and output via at least one transmission path among a plurality of transmission paths capable of transmitting data between the packet forwarding unit and the connectors, and
   the packet processing unit selects the transmission path depending on electrical connection between the connectors and the network interfaces, and processes the packet to be forwarded between the network interfaces.

7. The network apparatus according to claim 6, wherein
   the packet processing unit includes a packet forwarding unit configured to process a packet to be forwarded between the network interfaces and the plurality of connectors, and
   data transfer is controlled between the packet forwarding unit and the connector depending on the electrical connection between each connector and each network interface.

8. A packet processing device comprising:
   at least four connectors capable of coupling with one of network interfaces having different sizes to be accommodated in one slot; and
   a packet forwarding unit configured to process a packet to be input from one of the network interfaces via any one of the connectors, and output the packet toward one of the network interfaces to be coupled with the connector, wherein
   the network interface is two-dimensionally disposed on a plane parallel to a surface of a substrate of the network interfaces in the slot, with respect to the slot,
   at least two of the network interfaces have different sizes in two axial directions orthogonal to each other in a plane perpendicular to the parallel plane,
   the connectors are two-dimensionally disposed in a plane perpendicular to the substrate surface and are disposed in a one-dimensional direction parallel to the substrate in the plane perpendicular to the substrate surface for each network interface; and
   the packet processing device further comprises a path management unit configured to select a path corresponding to the connector to be electrically connected to the network interface depending on electrical connection between one of the connectors and the network interface.

\* \* \* \* \*